United States Patent [19]

Kitamura et al.

[11] 4,157,158

[45] Jun. 5, 1979

[54] TEMPERATURE RESPONSIVE VALVE ASSEMBLY

[75] Inventors: Kazuhiko Kitamura, Toyota; Masami Inada, Kariya, both of Japan

[73] Assignee: Aisin Seiki Kabushiki Kaisha, Aichi, Japan

[21] Appl. No.: 870,355

[22] Filed: Jan. 18, 1978

[30] Foreign Application Priority Data

Jan. 18, 1977 [JP] Japan ............................. 52/4938[U]

[51] Int. Cl.$^2$ ......................................... G05D 23/10
[52] U.S. Cl. ................................... 236/48 R; 236/87; 236/99 D
[58] Field of Search .................... 236/48 R, 87, 101 C, 236/99 D; 251/360; 123/117 A

[56] References Cited

U.S. PATENT DOCUMENTS

| | | | |
|---|---|---|---|
| 807,476 | 12/1905 | Leidecker | 251/360 X |
| 1,908,440 | 5/1933 | Milton | 251/360 X |
| 2,736,529 | 2/1956 | Songer | 251/360 |
| 4,026,464 | 5/1977 | Doherty, Jr. | 236/87 X |
| 4,068,800 | 1/1978 | Doherty, Jr. | 123/117 A X |
| 4,076,172 | 2/1978 | Inada et al. | 236/87 X |

*Primary Examiner*—William F. O'Dea
*Assistant Examiner*—William E. Tapolcai, Jr.

*Attorney, Agent, or Firm*—Oblon, Fisher, Spivak, McClelland & Maier

[57] ABSTRACT

A temperature responsive valve assembly includes a body having an inlet port and first and second outlet ports, a thermostatic bimetal disk disposed within the body and responsive to a variation in temperature to change the curvature thereof from a first position to a second position, a first seat portion disposed within a first passage between the inlet port and the first outlet port, a second seat portion disposed within a second passage between the inlet port and the second outlet port, a valve member arranged between the first and second seat portions and engageable with both seat portions, a connecting means following the movement of the bimetal disk to thereby actuate the valve members between a first position wherein the valve member engages with the first seat portion to control the first passage and a second positon wherein the valve member engages with the second seat portion to control the second passage, a seat member having the second seat portion thereon and being adjustably threaded with the body, the seat member having a projection receiving area, and a plate member secured to the body and having a projection positioned within the receiving area of the seat member.

6 Claims, 3 Drawing Figures

TEMPERATURE RESPONSIVE VALVE ASSEMBLY

BACKGROUND OF THE INVENTION

1. Field of the Invention

This invention relates to a temperature responsive valve assembly and more particularly to a temperature responsive valve assembly which selectively blocks two ports to prevent fluid flow from a common port to one of the ports while permitting flow to the other port.

2. Description of the Prior Art

Conventionally, various temperature responsive valve assemblies have been proposed in which are included a circular dish-shaped thermostatic bimetal disk movable in response to a variation in temperature to thereby connect a common port with a selected one of other ports. The valve assemblies of the above type are disclosed, for example, in U.S. Pat. Nos. 3,595,262 and 3,704,697. More particularly, the bimetal disk will snap in response to a variation in temperature from a first position wherein one port is blocked from the common port to a second position wherein the other port is blocked from the common port. This means that either of two ports has to be effectively blocked by the bimetal disk which ever position the bimetal disk occupies. This requires a precise snap range of the bimetal disk to selectively block two ports. It has been quite difficult to completely satisfy the above requirement and therefore the blocking or sealing effect has been decreased.

Furthermore, it is well known that the bimetal disk will suddenly snap during small variations in temperature. In other words, the bimetal disk will gradually change its curvature from a first position in which the bimetal disk blocks one port towards a second position in which the bimetal disk blocks the other port, when the bimetal disk senses a predetermined temperature. Thereafter, the bimetal disk will suddenly snap towards its second position and will reverse its curvature during a further small variation in temperature. Finally, the bimetal disk will gradually change its reversed curvature in accordance with a further increase in temperature. The above variation in temperature when the bimetal disk will suddenly snap is considerably small in comparison with the above variations in temperature when the bimetal disk will gradually change its curvature. Accordingly, it is desirable that the change-over valving function of the bimetal disk is completed during the above small variation in temperature in order to satisfy a good response of valving function. However, the above difficulty of the precise snap range will also adversely effect the good response of the valving portion.

In addition, in copending Patent Application Ser. No. 751,720 filed Dec. 17, 1976 by the same inventors and assignee of the present application there is disclosed an improved temperature responsive valve assembly wherein a snap range of a circular thermostatic bimetal disk can be adjustable.

However, the beforementioned temperature responsive valve assemblies do not have any means for assuring or maintaining an adjusted snap range of a bimetal disk.

SUMMARY OF THE INVENTION

It is, therefore, an object of the present invention to provide an improved temperature responsive valve assembly which obviates the various drawbacks of the prior assemblies.

More particularly, an object of the present invention is that means for assuring or maintaining an adjusted snap range of the bimetal disk is provided after the above range is adjusted thereby increasing a blocking or sealing effect.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

DETAILED DESCRIPTION OF THE PREFERRED EMBODIMENTS

A temperature responsive valve assembly 100 according to the present invention may be applied within an emission control system such as an engine spark timing control system and exhaust gas recirculation system, which are known in the art. The above valve assembly may be arranged between a signal pressure source such as an intake manifold of an engine and a servo mechanism of the emission control system, and may control a fluid communication therebetween so that the emission control system may be operated in a desired manner in response to engine temperature.

Figure 1:
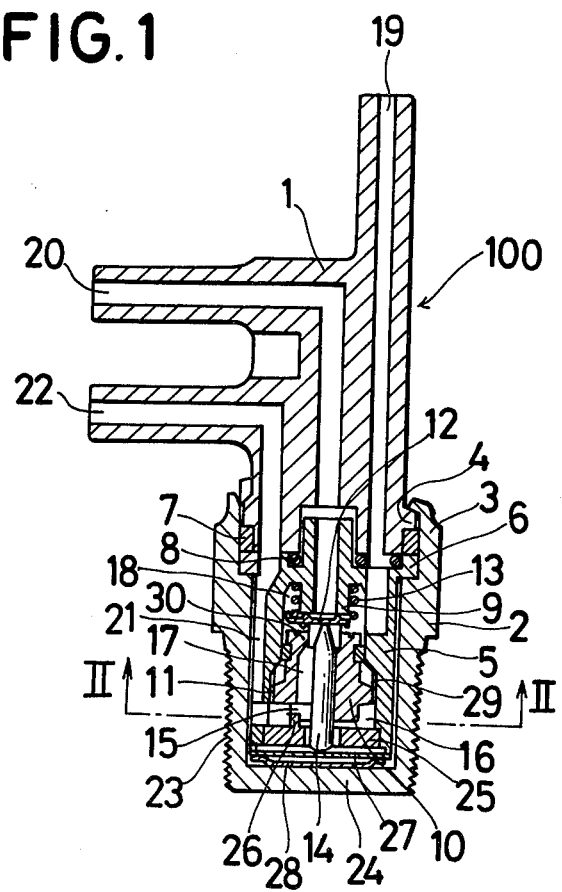
FIG. 1 is a cross-sectional view of the temperature responsive valve assembly according to the present invention.

Referring now to FIG. 1, the temperature responsive valve assembly 100 includes first and second bodies 1 and 2 secured to each other at portions 4 and 3 thereof through a seal member 7 and a flange 6 of an annular member 5. A further seal member 8 is arranged between the body 1 and annular member 5.

The member 5 has a first seat portion 9, and inner threads 29 through which outer threads 11 provided on a seat member 10 will be threaded. The seat member 10 having a second seat portion 30. Arranged between the seat portions 9 and 30 is a valve member 12 which is always biased towards the second seat 30 by means of a spring 13. A rod 14 which is slidably positioned within the seat member 10 is adapted to urge the valve 12 towards the first seal 9 against the biasing force of the spring 13.

Figure 2:
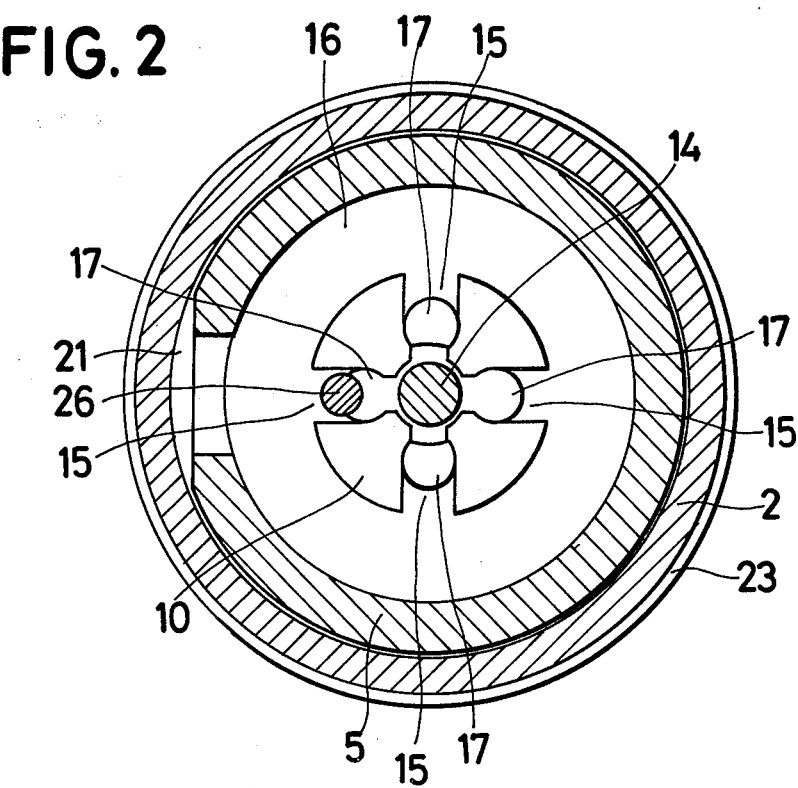
FIG. 2 is a cross-sectional view taken along the line II—II of FIG. 1.
Figure 3:
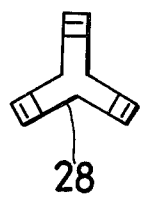
FIG. 3 is a plain view of a spring used in the valve assembly of FIG. 1.

The seat member 10 is formed, at the lower portion thereof, with radial passages 15, as is clearly shown in FIG. 2. The passages 15 are in communication with an annular passage 16 defined by the outer periphery of the seat member 10. The annular passage 16 is in communication with passages 17, formed in the seat member 10, which are, in turn, selectively connected to an annular chamber 18. The chamber 18 is adapted to always be in communication with an inlet or common port 19 provided in the first body 1 to thereby receive, for example, a signal fluid pressure. The annular chamber 18 is also selectively connected to a first outlet port 20 provided in the first body 1.

The annular passage 16 is always in communication with a second outlet port 22 provided in the body 1 through means of a passage 21.

The second body 2 may be formed of thermal conductive material and has thread portions 23 at the outer periphery thereof so that the body 2 is threaded through the wall of an engine water jacket. Thus, a lower portion 24 of the body 2 is positioned within engine cooling water for heat-exchange with the engine so that the variation in temperature of the engine cooling water can be transferred to a bimetal disk, as will be clear hereinafter.

As isolated plate 25 which is formed of non-conductive material may be fitted or secured to the lower end of the annular member 5 and has a projection 26. The projection 26 is positioned within one of passages 15 provided in the seat member 10, as will be clear in FIG. 2. Therefore, the plate 25 is prevented from rotating relative to position of the member 5. As a result, the seat member 10 may be prevented from rotating relative to the member 5 through means of arrangement of the projection 26 which may be arranged in engagement with a shoulder of seat member 10 defining the passage 15.

The lower end of the rod 14 engages with a circular dish-shaped thermostatic bimetal disk 27 which is biased by means of a spring member 28 towards the rod 14. The spring 28 includes three radial legs and a central circular portion, as will be more clearly seen in FIG. 2, so that the bimetal disk 27 is maintained in its proper position by means of the legs of spring 28. Thus the bimetal disk 27 is arranged to be snapped responsive to variations in temperature of engine cooling water through the second body 2. More particularly, the bimetal disk 27 will snap responsive to variations in temperature from its first position in which the disk 27 is of a convex configuration towards the rod 14 to its second position in which the disk 27 is of the convex configuration towards the bottom of the second body 2.

Since the isolated plate 25 is made of non-conductive material, the bimetal disk 27 can sense correctly variations in temperature of engine cooling water. In addition, signal fluid controlled by the valve member 12 will be under no influence of variations in temperature.

In assembling parts of the valve assembly 100, the seat member 10 is threaded with the annular member 5 while the space or gap between both seat portions 9 and 30 is slightly adjusted. Thereafter, the projection 26 of the plate 25 is positioned within one of passages 15 of the seat member 10, and then the plate 25 is secured to the annular member 5. Furthermore, it is desirable that one having the most proper length among rods of different lengths will be selected and assembled. Thus the above gap may be adjusted in the most proper way, and after assembling the seat member 10 is prevented from rotating relative to annular member 5 which is secured to the bodies 1 and 2 to thereby maintain or assure the adjusted gap between the two seat portions 9 and 30.

The inlet port 19 may be connected to an engine intake manifold so as to receive signal vacuum pressure in response to engine operating conditions. The outlet port 20 may be connected to a servo mechanism for an engine spark timing control system while the outlet port 22 may be connected to a control valve means for an exhaust gas recirculation system.

In operation, when the temperature of the engine cooling water is less than the predetermined temperature, the bimetal disk 27 will be in its first or illustrated position. Therefore, the valve member 12 is brought in contact with the seat portion 9, and is spaced from the seat portion 30.

Under the above conditions, signal vacuum pressure within the chamber 18 transmitted from the port 19 is transmitted to the outlet port 22 through means of passages 17, 15, 16, and 21. Now, the exhaust gas recirculation system will be in its operable condition.

When the temperature of the engine cooling water is higher than the predetermined temperature, the bimetal disk 27 will snap from its first position into its second position wherein the bimetal disk 27 is of convex configuration towards the bottom of the second body 2. Accordingly, the valve member 12 is disengaged from the seat 9 while it engages with the seat 30. This means that the inlet port 19 is blocked from the outlet port 22, but is brought into communication with the outlet port 20. Now, vacuum at the inlet port 19 can be transmitted to the servo means for the engine spark timing system.

The detailed explanation of the exhaust gas recirculation system is disclosed in, for example, U.S. Pat. No. 3,641,989, and the detailed explanation of the engine spark control system is disclosed in, for example, U.S. Pat. No. 3,606,871. Therefore, the detailed explanation of the emission control system is not described herein.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature responsive valve assembly comprising:
   a body having a common port and first and second ports,
   a thermostatic bimetal disk disposed within said body and responsive to a variation in temperature to change the curvature thereof from a first position to a second position,
   a first seat portion disposed within a first passage between said common port and said first port,
   a second seat portion disposed within a second passage between said common port and said second port,
   a valve member arranged between said first and second seat portions and engageable with said both seat portions,
   a connecting means following the movement of said bimetal disk to thereby actuate said valve member between a first position wherein said valve member engages with said first seat portion to control said first passage, and a second position wherein said valve member engages with said second seat portion to control said second passage,
   a seat member having said second seat portion thereon and being adjustably threaded with said body, said seat member having a projection receiving area, and
   a plate member secured to said body and having a projection positioned within said receiving area of said seat member.

2. A temperature responsive valve assembly as set forth in claim 1, where:
   said plate member is made of a non-conductive material and arranged between said seat member and said bimetal disk.

3. A temperature responsive valve assembly as set forth in claim 1, wherein;
said body has an annular member which is secured thereto, said annular member having inner periphery threads which engage with threads provided on outer periphery of said seat member.

4. A temperature responsive valve assembly as set forth in claim 1, wherein; said projection receiving area forms a part of said second passage.

5. A temperature responsive valve assembly as set forth in claim 1, further comprising:
a spring means biasing said valve member towards said connecting means.

6. A temperature responsive valve assembly as set forth in claim 1, further comprising:
a spring means biasing said bimetal disk towards said first position.

* * * * *